Jan. 6, 1959  J. DOYEN  2,867,678
NEGATIVE ELECTRODE FOR SILVER-ZINC BATTERIES
Filed Jan. 26, 1956

INVENTOR.
JEAN DOYEN
BY
ATTORNEY

United States Patent Office 2,867,678
Patented Jan. 6, 1959

2,867,678

NEGATIVE ELECTRODE FOR SILVER-ZINC BATTERIES

Jean Doyen, Paris, France, assignor to Yardney International Corporation, New York, N. Y., a corporation of New York Application January 26, 1956, Serial No. 561,592

Claims priority, application France January 28, 1955

2 Claims. (Cl. 136—71)

This invention relates to a negative electrode for a silver-zinc accumulator or storage battery.

In the manufacture of silver-zinc accumulators heretofore, the negative electrode was usually provided in the form of a wafer or cake of a finely divided substance in powder or paste form, said substance generally comprising in its initial condition zinc oxide and sometimes zinc. The negative substance in such divided form readily enters into the desired electro-chemical reaction and the accumulator can be practically used without requiring to be put through a large number of forming cycles. Such electrodes are used in accumulators designed for various rates of discharge, and also in so-called "primable" generators, i. e., wherein the electrodes, on the one hand, and the electrolyte, on the other, are initially located in separate compartments, adapted to be placed in communication only at the time of use. In such systems, in particular, the irruption of the electrolyte into the electrode compartment, which desirably should be effected rapidly in order to make an electric current output instantaneously available, exerts an extremely violent action upon the electrodes, the negative electrode in particular tends to break up or disaggregate, thus impairing the operating characteristics of the generator in subsequent use. Moreover, a similar disaggregation of a negative electrode is liable to occur, to some extent at least, under the effect of impacts and vibrations sustained by the accumulator during transportation and in use.

It has already been proposed, in a silver-zinc accumulator, to provide the negative electrode initially in the form of a solid or massive zinc plate—in contradistinction to discrete particles of zinc or zinc compounds. However, such accumulators, if they are to possess an adequate electric capacity, have to be subjected to a prolonged forming process, comprising a large number of successive operating cycles, i. e., charges and discharges, so that a comparatively long lapse of time is present between their manufacture and the time they can be effectively put to work.

A negative electrode according to the invention, while being of the massive or solid type, and thus inherently possessing high mechanical strength, makes it possible to provide a silver-zinc accumulator that can be put to use immediately it has been manufactured, i. e., after assembly of its component elements, without requiring a prolonged forming process.

It is therefore an object of the invention to provide a negative electrode for a silver-zinc accumulator which simultaneously possesses the high mechanical characteristics of a massive or solid electrode, whereby it will not be liable to damage from shock, vibrations, and the like, and the high electro-chemical characteristics of an electrode comprising finely-divided material in powder or paste form.

It is another object to provide such a negative electrode which will be simple and economical to make.

Another object is the provision of a silver-zinc accumulator wherein the negative electrode is initially in the form of massive or solid zinc and which will nevertheless be adapted to yield considerable electrical energy even at its first discharge. A more specific object is the provision of such an accumulator which is of the "primable" type and wherein, despite the violent irruption of electrolyte, as required to promote a rapid delivery of current, the electrodes will nevertheless retain a permanent shape, thereby making it possible to derive maximum benefit from the amounts of electrochemical substances that are effectively present therein.

Figure 1:
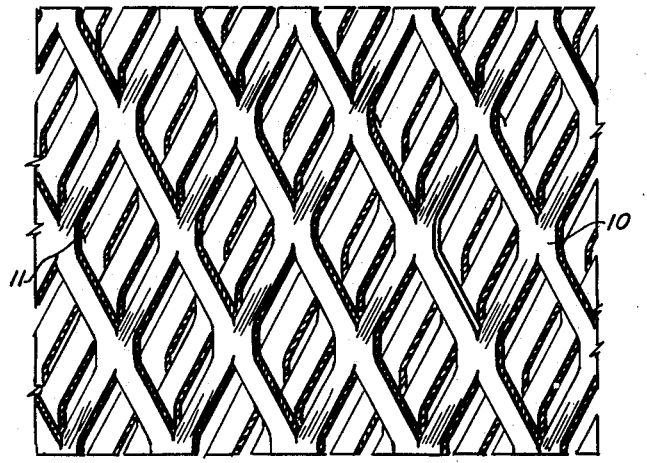
Fig. 1 is a plan view of a battery electrode embodying the invention.
Figure 2:
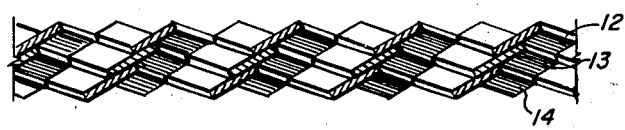
Fig. 2 is a side view of the electrode of Fig. 1.

In accordance with the invention, a negative electrode 10 for a silver-zinc accumulator comprises expanded zinc.

It has already been suggested to construct grating, fences, concrete reenforcing elements, and the like, from so-called expanded metal, obtained by perforating and bending flat metal sheeting. Such expanded-metal sheets are well-known in the engineering fields just mentioned. Now the application of expanded zinc according to the invention for the construction of a negative electrode for a silver-zinc accumulator has yielded surprising and unexpected results. Thus, while all earlier attempts to produce an electrode from a perforated zinc plate, in order that the electrode might retain its massive or solid character while increasing its contact area with the electrolyte, had met with failure, the novel expanded-zinc electrode has made it possible to construct a silver-zinc accumulator which, all other factors being equal, possesses electro-chemical characteristics comparable with, if not superior to, those obtained with a negative electrode made of a finely divided substance, while eliminating the inherent drawbacks of the latter type of electrode.

It is believed that these surprising results are not only due to the relatively great increase in contact area between the zinc and the electrolyte surrounding it caused by the formation of a lattice of non-planar or warped loops and openings 11, but that a major reason for the improved operation lies in the particular characteristics imparted to the surface itself by the cutting, shearing and bending operations. These operations appear to roughen or pit the surface in a manner similar to etching by an acid such as hydrochloric acid, creating a multiplicity of minute asperities and depressions of microscopic size, which increase the effective contact area in such proportions that it becomes comparable to the contact area available in an electrode made from a substance in divided form.

Such an electrode will provide a practically continuous supporting surface for the adjacent elements of the accumulator, particularly the positive electrode, separated therefrom by a suitable spacer element, while permitting practically free and unobstructed communication between the spaces lying to either side of its opposite faces, through the perforations of all sizes provided therethrough in directions at an angle to said faces, and such communications promote an efficient and fast progress of the electro-chemical reaction.

The invention provides for a negative electrode comprising a lamination of a number of expanded zinc sheets 12, 13, and 14, the lamination desirably being produced by winding a single expanded-zinc strip around a suitable cylindrical mandrel or flat template.

The invention further provides that a current lead-in or lead-out conductor may be inserted before or during the above winding step, which conductor may if necessary be connected to the electrode by solder or otherwise.

Thus laminating a plurality of sheets of expanded zinc, each of which is comparatively very thin, e. g., of the order of one tenth of one millimeter, imparts sufficient mechanical strength to the electrode whereby it is easy and safe to handle. Moreover, as a result of such procedure, a continuous-contact engagement may be obtained between the negative electrode and its complementary electrode.

The presence of minute perforations provides for an automatic discharge of gases, that is, any gases liable to form during certain stages of the electro-chemical reactions will be readily discharged to the outer atmosphere. At the same time, a uniform distribution of the electrolyte is thus achieved.

In operation, the zinc in the electrode is converted to zinc oxide or hydrate, and at the next discharge step, the oxide or hydrate will be reconverted into zinc which will then possess a divided powder-like structure so that after a certain number of cycles the electrode will be quite comparable to electrodes of the type initially formed from divided zinc material, as hereinabove explained.

What I claim is:

1. A negative electrode for batteries of the alkaline type, comprising a sheet composed of a plurality of apertured layers of expanded zinc laminated together in staggered relationship of their apertures, each of said layers having a thickness of the order of one tenth of a millimeter and not exceeding one millimeter.

2. A negative electrode for electrochemical batteries of the alkaline type comprising a body of active material which consists of an apertured layer of expanded zinc, said layer having a thickness of the order of one tenth of a millimeter and not exceeding one millimeter, and means for supporting said layer.

References Cited in the file of this patent

UNITED STATES PATENTS

| | | |
|---|---|---|
| 604,418 | Rosler | May 24, 1898 |
| 1,918,947 | Williams | July 18, 1933 |
| 1,982,485 | Salmon et al. | Nov. 27, 1934 |
| 2,275,194 | Sizelove | Mar. 3, 1942 |